United States Patent [19]

Bickel

[11] 4,127,856
[45] Nov. 28, 1978

[54] VEHICLE-DOCK LATCHING APPARATUS
[76] Inventor: Gary G. Bickel, 906 Paulding Rd., Fort Wayne, Ind. 46807
[21] Appl. No.: 786,070
[22] Filed: Apr. 11, 1977
[51] Int. Cl.² ............................................. G08B 21/00
[52] U.S. Cl. .................................. 340/687; 14/71.1; 280/508
[58] Field of Search ............... 340/275; 280/508, 504, 280/432; 14/69.5, 71.1, 71.3

[56] References Cited
U.S. PATENT DOCUMENTS 2,874,921  2/1959  Knighton et al. .................... 280/508
3,697,974  10/1972  Harris et al. .......................... 340/275

Primary Examiner—Glen R. Swann, III
Attorney, Agent, or Firm—Gust, Irish, Jeffers & Rickert

[57] ABSTRACT

A latch member is affixed near one end of a vehicle body and may be in the form of a rigidly supported horizontal rod spaced from the body. A latch is attached to a loading dock in position for registration with the rod as the vehicle body approaches the dock. The latch automatically releasably engages the latch rod to releasably hold the vehicle body to the dock to prevent relative movement between the body and the dock during load transfer between the dock and the body. The latch may be pivoted or otherwise movably adjustable relative the dock to receive rods at different rod positions relative the dock. Signal lights are provided to indicate the latch condition. A remote latch control is provided for operation from the vehicle operator station.

10 Claims, 6 Drawing Figures

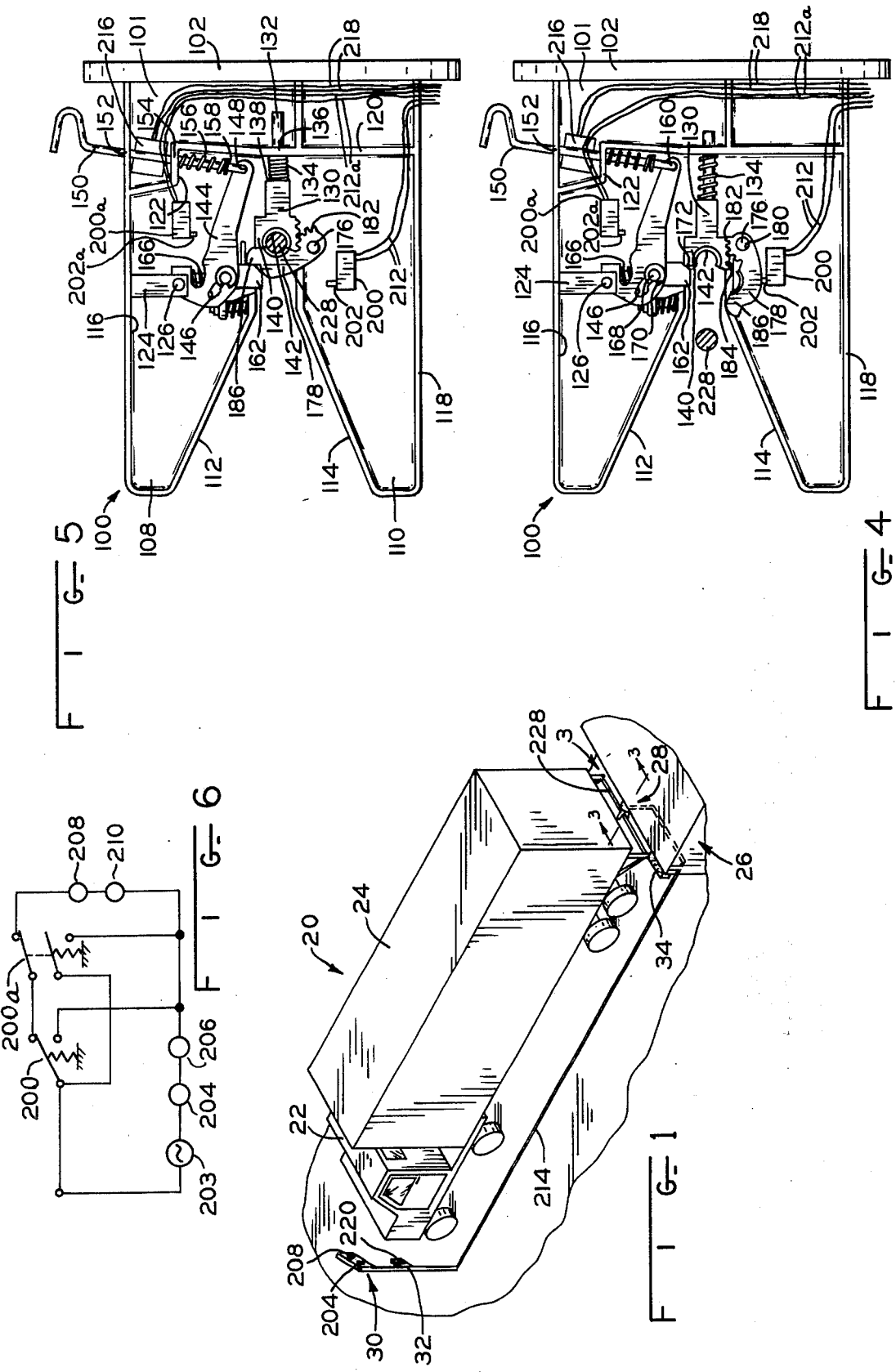

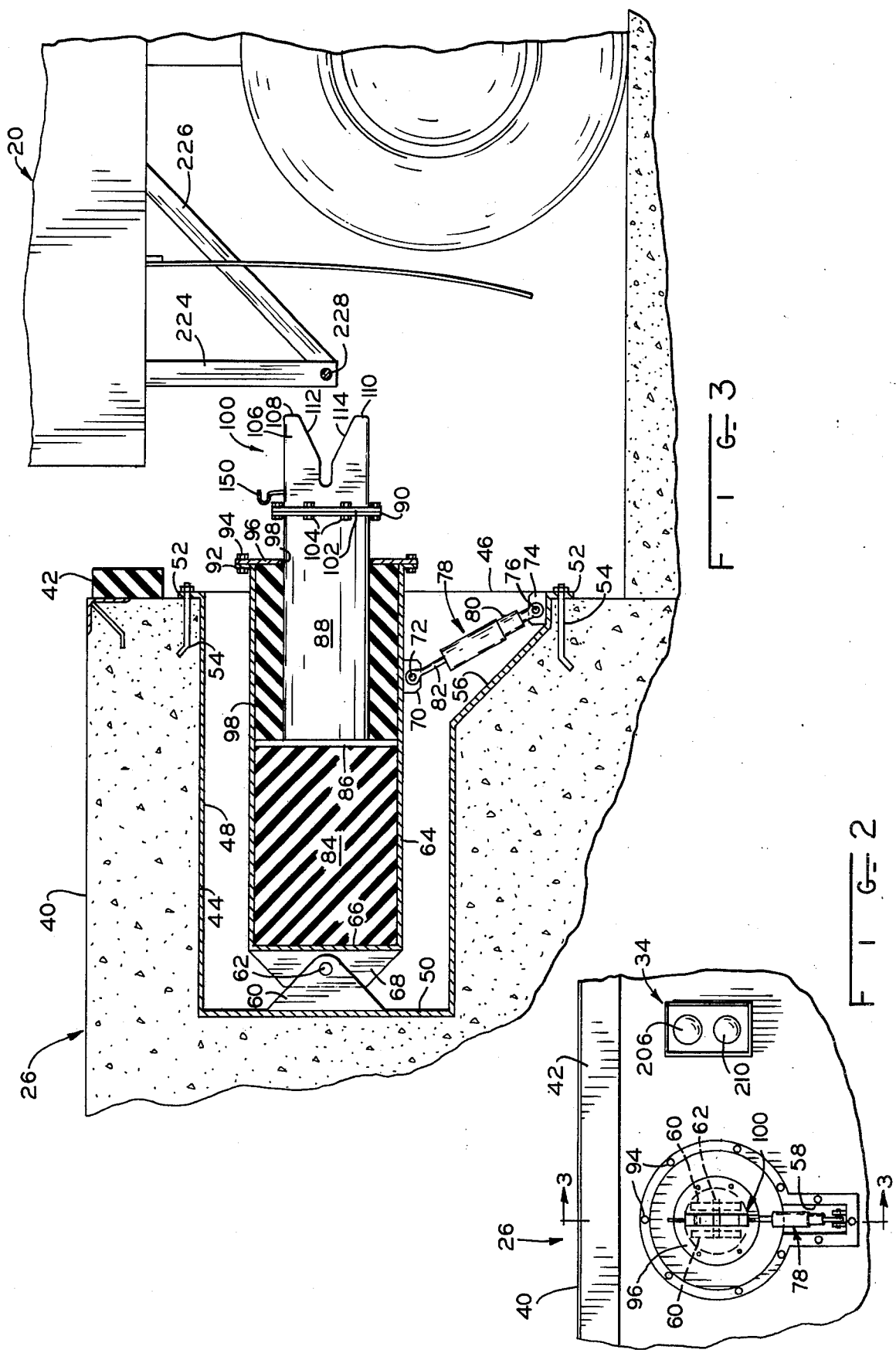

VEHICLE-DOCK LATCHING APPARATUS

BACKGROUND OF THE INVENTION

1. Field of the Invention

This invention is in the field of vehicle-dock apparatus which relatively positions and holds the vehicle and dock during load transfer between the vehicle and the dock, and especially where the vehicle is a trailer body adapted for transport by a conventional truck tractor.

2. Description of the Prior Art

Land transport of freight is accomplished by motor truck or tractor-trailers as well known in the art. In order to transfer freight to or from a truck or trailer body, it is common to position the truck or trailer body adjacent a loading dock which is substantially level with the floor of the truck or trailer after which the load transfer, frequently with a fork-lift truck is made. In order to prevent relative movement between the dock and the vehicle, and thus prevent serious injury to the loading equipment, the freight, and most importantly the workmen who are transfering the load, wheel blocks have been placed against the vehicle wheels. These have proved unsatisfactory since the blocks frequently shifted in position after being placed under the wheels so that the vehicle would move away from the dock, and also the blocks frequently are not used due to oversight on the part of the workmen. Also, since the block storage was required between uses, they were often not conveniently available and therefore not used at all. Certain manually operated locking devices have been attempted in the past but due to the difficulty of use requiring manual actuation after maneuvering the vehicle into loading position, and the requirement of substantial additional apparatus to the vehicle body and the lack of adjustability and uniformity between the vehicle and docking latch devices, have not been successful.

SUMMARY OF THE INVENTION

A latch member, in the form of a horizontal rod, is rigidly supported below the underside of, and at the rear end of, the vehicle trailer. A horizontal well is formed in a loading dock beneath the dock floor. A cylinder is pivotably mounted to the end surface of the well and reciprocably supports a piston therein. A resilient plug is mounted in the end of the cylinder and engages the piston face. A piston shaft is affixed to the piston and extends outwardly of the cylinder and has a latch for automatically latching the latch member upon engagement therewith. A resilient annular sleeve is placed around the piston shaft and engages the opposite face of the piston and cylinder end so that the piston is resiliently retarded in both directions of movement in the cylinder. A conventional automatic latch has a latch arm mechanism which is responsive to engagement with the latch member for automatically latching the member to the latch. The latch has diverging jaw surfaces for receiving latch rods of varying heights and automatically pivots upon engagement between a jaw surface and the rod to cause registration between the rod and the latch mechanism. A shock absorber is pivotably mounted to the outer wall of the cylinder and the well to aid in pivotable registration between the rod and the latch mechanism. Signal lights are provided on the dock wall and at a position adjacent the vehicle cab to indicate to the vehicle operator when the latch is in a release position so that the operator will be informed as to the condition of the latch and will not attempt to automatically engage the latch or move the vehicle away from the dock during closed condition of the latch. A manually operated release, which may be remotely located from the latch, is provided for the latch operation from the vehicle operator station or by an assistant prior to movement of the vehicle away from the dock. Alternatively, the latch rod could be affixed to the dock and the latch could be mounted to the vehicle.

Therefore, a relatively simple, latching member and latch are provided which automatically latches the vehicle to the dock upon engagement between the member and the latch. No separate member, such as a wheel block, is required and no manual actuation after the vehicle has been maneuvered into loading position is necessary to latch the vehicle to the dock. Once latched, the vehicle will remain in fixed position to the dock and will thus prevent inadvertent vehicle movement away from the dock and resultant injury to the workmen, loading equipment, and freight. Visible signal means are provided to indicate to the vehicle operator the condition of the latch, and if desired, a solenoid operated remote latch release may be provided to the vehicle operator for operation from or adjacent to his cab. Also, the teaching of this invention may be applied for latching a boat to a dock or an airplane to a tie-down station.

It is therefore an object of this invention to provide an automatic latching mechanism between a vehicle and a stationary structure such as a dock.

Another object of this invention is to provide in the mechanism of the previous object a mechanism which is self-adjusting to provide registration between a latch member and a latch for different relative member and latch positions prior to latching.

It is an object of this invention to provide a signal device to the vehicle operator to indicate the latch condition.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a view in perspective of a vehicle attached to a dock with a latch apparatus of this invention;

FIG. 2 is an enlarged end view of a latch mounted to a dock;

FIG. 3 is a section taken at 3—3 of FIG. 2;

FIG. 4 is an enlarged side elevational view of a latch mechanism with the latch shown in the open position;

FIG. 5 is a view similiar to the view in FIG. 4 with the latch shown in the closed position; and, FIG. 6 is a schematic circuit diagram for the latch condition signals.

DESCRIPTION OF THE PREFERRED EMBODIMENT

Referring to the drawings, a vehicle 20, or tractor 22 and a trailer 24, is latched to a loading dock 26. A latch apparatus is shown generally at 28 and a visual latch condition signal is shown generally at 30. A remote control latch operation switch 32 is shown mounted to the support for signal 30 and a visual latch condition signal 34 is shown mounted to dock 26 visible from the driver side of cab 22. In general operation, the vehicle operator will back his truck into a stall at dock 26 and if signals 30 and 34 indicate the latch is open, will continue backing until apparatus 28 automatically latches on engagement of the respective latch devices on trailer 24 and dock 26. If signals 30 and 34 indicate the latch is closed, the vehicle operator can operate remote unit 32 to open the latch or have it manually opened by an assistant at the dock.

Referring now to FIGS. 2 and 3, dock 26 has a dock floor 40 and an elongated resilient bumper strip 42 affixed to the loading end thereof. A horizontal well 44 is formed in wall 46 of dock 26. A cylindrical casing 48, which preferably is of a rigid material such as galvanized iron, having a closed end 50, is inserted in well 44 and fastened thereto through peripheral casing flange 52 by a plurality of anchor bolts 54. Casing 48 has a wall section 56 at the lower portion thereof which is formed outwardly and downwardly to form a slot 58 depending from cylinder 48, for purposes later explained.

A pair of spaced brackets 60 are affixed, as by welding, to end wall 50, and support a pivot pin 62. A cylinder 64 with end wall 66 has affixed thereto a pivot plate 68 with an opening for receiving in rotatable relation pin 62 so that cylinder 64 is pivotable about pin 62. Cylinder 64 is smaller in diameter than casing 48 to provide adequate clearance for arcuate movement of cylinder 64 in casing 48. Cylinder 64 has a bracket 70 affixed as by welding to the lower surface thereof and supports a bracket pin 72. A bracket 74 is affixed as by welding to wall 56 of casing slot 58 and carries a bracket pin 76. A shock absorber 78 of conventional construction and commercially available has its housing 80 pivoted to pin 76 and piston rod 82 pivoted to pin 72. Rod 82 is connected to the shock absorber piston which is mounted for reciprocable movement in housing 80 and resiliently supported therein in the usual manner of conventional shock absorbers. Thusly, cylinder 64 is supported in a substantially horizontal position in casing 48 but is free to move in either an upward or downward arcuate path for purposes later explained.

Placed in cylinder 64 is a resilient plug 84, made of rubber or other resilient material, and has a diameter corresponding to the inner diameter of cylinder 64 and a axial length approximately one half that of cylinder 64. A piston 86 is reciprocably mounted in cylinder 64 and is affixed, as by welding, to a piston shaft 88 which has at its opposite end a peripheral flange 90. Cylinder 64 has a peripheral flange 92 at the right end thereof to which is bolted, as with bolts 94, an annular end plate 96 having an opening 98 formed centrally thereof through which shaft 88 extends and is reciprocably supported. A sleeve 98 of resilient material such as rubber, is placed around shaft 88 and at one end bears against piston 86 and at its other end bears against end plate 96 to resiliently retard movement of piston 86 in the rightward axial direction. Piston 86 is resiliently retarded in the leftward direction by plug 84.

A latch 100 has a circular flange 102 which is peripherally attached as with bolts 104 to flange 90. A plate 106 is affixed, as by welding, to plate 102 and has opposing jaws 108, 110 with diverging jaw surfaces 112, 114 respectively. As seen in FIGS. 4 and 5, plate 100 has a rib 116 formed along the upper surface thereof and along jaw 108 and a rib 118 formed along the lower surface thereof and along jaw 114. Plate 116 also has a web 120 formed thereon and connected to and extending transversely from rib 118. A web offset 122 connects web 120 and rib 116. A post 124 is affixed, as by welding, to rib 116 and depends therefrom and supports a pivot pin 126.

A plunger 130 having a shaft 132 which carries a coil spring 134 is reciprocably mounted in an opening 136 in web 120. Spring 134 acts between web 120 and shoulder 138 to urge plunger 130 in a leftwardly direction as viewed in FIG. 4. Plunger 130 has a head 140 which has an arcuate surface 142 formed in the end thereof. A release arm 144 is pivotably supported by pin 126 and has a slot 146 formed therein and an opening 148 formed at the end thereof. An elongated release handle 150 is reciprocably supported in an opening 152 in rib 116 and in opening 154 in offset 122 and carries a coil spring 156 which acts between offset 122 and a washer 158 which seats in a groove in handle 150 to fix washer 158 relative handle 150. Spring 156 urges handle 150 in a downward direction as viewed in FIG. 4. The end 160 of handle 150 is formed at a right angle to handle 150 and is pivotably supported in opening 148. Thus, it is seen that an upward pull on handle 150 will pivot arm 144 in a counterclockwise direction about pivot pin 126.

An elongated latch lock 162 having a stem about which is placed a coil spring 166 to urge lock 162 in a downward direction, as viewed in FIG. 4, has a pin 168 extending transversely therefrom, with pin 168 extending through slot 146 and carrying a split lock ring 170 at the end thereof. Thus, counterclockwise movement of arm 144 will cause pin 168 to ride leftwardly in slot 146, as viewed in FIG. 4, moving lock 162 against the force of spring 166. Head 140 bears against a cammed portion 172 on the head of lock 162 when plunger 130 is in its leftward position as shown in FIG. 4.

A pivot pin 176 is affixed to and extends transversely from plate 106 and an arm 178 has an opening 180 for receiving pin 176 to rotatably support arm 178. Arm 178 has cogs 182 formed thereon which are in mesh with a toothed ramp 184 formed on the lower side of head 140 so that movement of plunger 130 will cause rotation of arm 178. Leftward movement of plunger 130 will pivot arm 178 in a counterclockwise direction and rightward movement of plunger 130 will pivot arm in a clockwise direction about pin 176, all as viewed in FIG. 4. Arm 178 has end 186 which engages and lifts lock 162 on clockwise movement of arm 186 until arm 178 is in an upright position, as shown in FIG. 5, at which time lock 162 snaps downwardly to hold and lock arm 178 in its upright position. Upon an upward movement of release handle 150, lock 162 will be raised and plunger 130 will be moved leftwardly under the force of spring 134 to rotate arm 178 in a counterclockwise direction due to the engagement between toothed ramp 184 and cogs 182. The construction and operation of latch 100 described to this point is of a conventional latching mechanism commonly used in the trucking industry for engaging and latching a tractor to a trailer and commonly referred to as a "fifth wheel". Such a device is commercially obtainable from a number of companies in the truck supply industry.

This invention provides switches 200, 200a affixed to plate 106 and having spring biased operator buttons 202, 202a respectively which are in the path of arms 178 and 144 respectively. Button 202 is depressed by arm 178 when plunger 130 is in its leftward position, FIG. 4 and button 202a is depressed when 144 is raised by handle 150. Signals 30 and 34 have green signal lights 204, 206 respectively which are fully energized with either button 202 or 202a is depressed and have red signal lights 208, 210 respectively which are energized when buttons 202 and 202a are extended. Wires 212 and 212a from switches 200 and 200a respectively are connected to a power supply 203 and circuitry shown in FIG. 6 for energizing lamps 204, 206, 208, and 210, which circuitry is preferably mounted in dock 26. Switch 200 is a single pole double throw switch spring biased to its upward position and switch 200a is a double pole double throw switch spring biased to an upper position. A cable 214 (FIG. 1) carries electrical conductors from dock 26 to lamps 204, 208. A solenoid 216 is mounted to plate 106 and handle 150, which is of a magnetic material, is mounted centrally therein and movable upwardly thereby to a release position when solenoid 216 is energized. Electrical conductors 218 are connected to a power supply, not shown but of conventional design, and preferably mounted in dock 26. A solenoid operating button 220 is mounted in control 32 and is connected to the solenoid power operating circuitry by electrical conductors in cable 214 so that depression of button 220 will act as a remote release for handle 150.

Rigidly mounted and depending from the underside of vehicle 20 is a strut 224 and angular brace 226 which carry and rigidly support a transverse latch rod 228 (FIG. 3). As will become apparent in the description below, rod 228 when moved in a rightward latching direction, FIG. 4, will engage surface 142 and upon continued rightward movement will move plunger 130 against spring 134 causing arm 186 to move in an automatic latching rotation about pin 176 to latch rod 228 as shown in FIG. 5.

In the operation of this embodiment, a truck operator will back the trailer into a stall at loading dock 26, in the usual manner and if only green lights 204, 206 are illuminated, indicating latch arm 186 in the open position, FIG. 4, will continue backing until rod 228 engages arcuate surface 142 moving plunger 130 rightwardly against spring 134. Due to the engagement between rack 184 and cogs 182, arm 178 will be rotated in a clockwise direction lifting lock 162 as it passes until latch arm 178 is upright, FIG. 5, at which time lock 162 will snap downwardly locking rod 228 between arm 178 and surface 142. In this position, the trailer 24 will be latched to dock 26 to provide for safe load transfer between the vehicle 20 and dock 26. If rod 228 does not exactly register with surface 142 when moving in the rightward or latching direction, FIG. 4, it will engage either surface 112 of jaw 108 if rod 228 is above surface 142, or surface 114 of jaw 110 if rod 228 is below surface 142. This will cause respective upward or downward pivoting of cylinder 64 about pivot pin 62 (FIG. 3) against the support of shock absorber 78 to properly position rod 228 and surface 142 at which time the above described automatic latching procedure will be performed. After the desired load transfer has been completed between vehicle 20 and dock 26, release handle may be manually raised causing arm 144 to be pivoted counterclockwise about pin 126 to move lock 162 in an upward direction releasing arm 178. At this point, arm 144 will engage button 202a energizing the green lights 204, 206 fully indicating to the truck operator that the latch is in release condition and the vehicle can be moved away from dock 26. Once arm 178 has swung in its counterclockwise position to engage button 202, the green light will remain fully on indicating that the latch is open even after handle 150 has been released. If assistance is not available for manually releasing handle 150, the truck operator can push button 220 to energize solenoid 216 lifting release handle 150 against spring 156 to maintain the latch in a released position to permit movement of vehicle 20 away from the dock 26. Similarly, the operator can remotely operate handle 150 when backing toward dock 26 when latch is desired but red lights 206, 208 indicate a closed latch condition.

While there have been described above the principles of this invention in connection with specific apparatus, it is to be clearly understood that this description is made only by way of example and not as a limitation to the scope of the invention.

What is claimed is:

1. Apparatus for latching a vehicle having a vehicle operator station to a dock comprising:
   a latch member attached to one of said vehicle and dock;
   latch means attached to the other of said vehicle and dock for receiving and automatically latching said member;
   release means for releasing said member from said latch means; and
   means for automatically registering said latch member with said latch means.

2. The apparatus of claim 1 wherein said latch means automatically latches said member upon contact between and a predetermined relative movement between said member and said latch means.

3. The apparatus of claim 1 having a resilient mounting means for resiliently mounting one of said latch member and latch means to its respective dock and vehicle.

4. The apparatus of claim 1 having shock absorbing means for shock absorbingly mounting one of said latch means to its respective dock and vehicle.

5. The apparatus of claim 1 wherein said release means comprises a manually operable release remotely positioned from said latch means and adjacent to the vehicle operator station to operate said latch means from the vehicle operator station.

6. The apparatus of claim 1 wherein said latch means has an open latch member receiving condition and a closed latch member retaining condition;
   indicating means apart positioned from said latch means for visually indicating whether the latch means is in said open or closed condition.

7. The apparatus of claim 6 wherein said indicating means is placed on said dock and at a position adjacent said vehicle operator station.

8. Apparatus for latching a vehicle having a vehicle operating station to a dock comprising:
   a latch member comprising an elongate rod affixed to one end of said vehicle;
   latch means comprising a pressure sensitive automatic latch mounted to said dock and registrable with said rod and responsive to pressure in a latching direction from said rod for automatically latching said rod to said latch to prevent relative movement between said rod and said latch; and
   release means for releasing said member from said latch means.

9. The apparatus of claim 8 wherein said rod is horizontal;
   said latch means comprises a pair of divergent jaws opening in a vertical plane for receiving said rod;
   said latch means being pivotably mounted to one of said vehicle and dock about a horizontal axis to provide a pivoting of said jaws about said axis upon engagement of said jaws with said rod.

10. Apparatus for latching a vehicle having a vehicle operating station to a dock comprising:
- a latch member attached to said vehicle;
- latch means pivotably supported in a dock wall for receiving and automatically latching said member;
- release means for releasing said member from said latch means; and
- shock absorber means for positioning said latch means in a predetermined pivotal position and for providing regulated pivotal movement to said latch means upon engagement with said latch member.

* * * * *